Patented Aug. 14, 1945

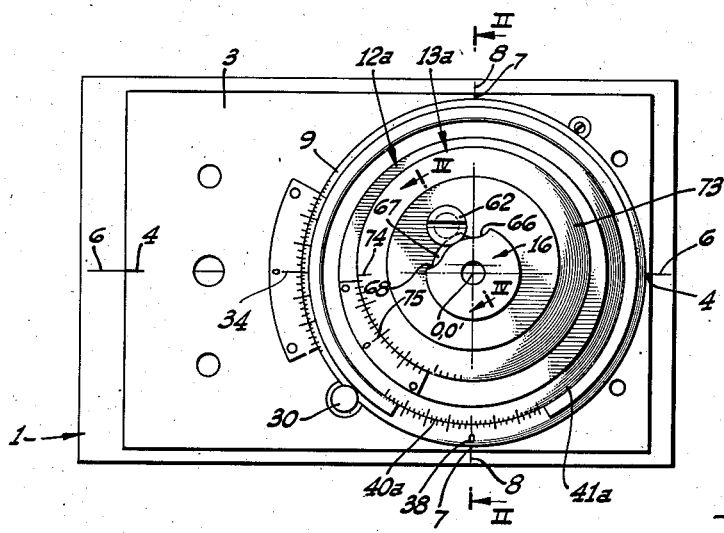

2,381,943

UNITED STATES PATENT OFFICE 2,381,943

DRILL JIG

William C. Williams, Santa Monica, Calif.

Original application May 26, 1942, Serial No. 444,537. Divided and this application March 18, 1944, Serial No. 527,076

1 Claim. (Cl. 77—62)

My invention relates to a fixture or jig and has particular reference to an adjustable drill guide by means of which holes may be drilled in an accurately located predetermined position with respect to known reference lines or axes on the work-piece.

This application is a division of my copending application Serial No. 444,537, filed May 26, 1942, now forfeited, and entitled "Drill jig."

In certain manufacturing industries such as, for example, the aircraft manufacturing industry, certain of the fabricating or assembling operations give rise to the frequent necessity for changing the location of one of a plurality of holes in a workpiece.

As a rule this change in location is slight; that is, the new location of the hole is usually close to the old location. This introduces a considerable problem where layouts, templets, jigs and the like have all been prepared on the basis of the old location of the hole. It is the present practice to provide for drilling the hole in the new desired location by either manually ascertaining the new hole location and using a center punch to indicate that location on the workpiece, or changing all of the fixtures, jigs or templets used in the drilling or prefabricating process to make such jigs conform to the new location of the hole that has been moved. Alternatively, a special jig can be built for drilling the one hole that has been moved.

The disadvantages attendant upon following any one of these courses of procedure is evident. The manual layout method occasions a considerable loss of time and requires the inefficient services of one or more men. To change or rebuild all of the fixtures or jigs is obviously an expensive and time-consuming operation. If a special jig is used for the one hole involved, that jig is useless for any other operation involved in the manufacturing program and must, of course, be discarded whenever the need for using the same ceases to exist as when a new set of jigs is provided or the plans and specifications are again changed.

It is therefore an object of my invention to provide a drill guide which overcomes the above noted disadvantages by providing an adjustable means for readily and accurately positioning a drill guide of substantially any selected size at substantially any desired location relative to the origin of previously established reference axes of a workpiece.

It is a still further object of my invention to provide a drill guide of the character set forth hereinbefore which includes a means for accurately positioning a drill guide in such relation to the reference axes of the workpiece as to dispose the drill guide axis in any desired location relative thereto.

Other objects and advantages of my invention will be apparent from a study of the following specifications, read in connection with the accompanying drawing, wherein:

Fig. 1 is a top plan view of a device constructed in accordance with an embodiment of my invention and intended particularly to be used in the locating of holes in a workpiece;

Fig. 2 is a cross sectional view taken substantially along the line II—II of Fig. 1 and illustrating additional details of construction;

Fig. 3 is a diagrammatic view illustrating the geometrical principles involved in the operation of the form of the device which is illustrated in Fig. 1; and Fig. 4 is a transverse sectional view taken substantially along the line IV—IV of Fig. 1 and illustrating a type of locking arrangement for the drill guide proper which may be employed on the form of the device illustrated in Fig. 1.

Referring to the drawing, I have illustrated in Fig. 1 the preferred embodiment of my invention as comprising an adjustable drill guide which may be used to shift the location of the hole to be drilled by any desired amount and in any desired direction with respect to reference axes 6 and 8 on a workpiece 1.

As is shown in the figures, the device is intended to be used for the purpose of shifting the origin O (the original location of the center line of the hole to be drilled) from the intersection of the reference lines 6 and 8 to a new location O' spaced from the origin by a distance X along a radius, making any desired angle with the longitudinal reference line 6. This structure is illustrated in plan in Fig. 1 and in cross section in Fig. 2 as comprising a base member 3 carrying index lines 4, 4 and 7, 7 for use in locating the base 3 on the workpiece 1 with respect to the reference lines 6 and 8. The intersection of lines drawn between the index marks 4 and between the index marks 7 defines a vertical axis 10 of the device. A guiding bore 47 is drilled in the base 3 concentrically with respect to the vertical axis 10.

An outer rotatable member or bushing 12a includes a cylindrical portion 46a adapted to closely fit within the aperture 47 and be guided thereby for rotation about the vertical axis 10. The outer member 12a carries a protractor ring 41a carrying graduations 40a to indicate the angular position of the outer rotatable member 12a with respect to an index 38. The index 38 is carried by an adjustable protractor ring 9 mounted on the base 3 within a groove 18. An index 34 is provided on the base 3 for use with the angular graduations on the protractor ring 9. A clamping screw 30 may be used to lock the ring 9 against inadvertent shifting.

The outer rotatable member 12a is provided with a longitudinally extending bore 69 which is cylindrical about a vertically extending axis 70 disposed parallel to the vertical axis 10 but offset therefrom by a distance R. Within the bore 69 there is received a cylindrical portion 71 of an inner member or bushing 13a, which inner member includes a horizontal upper surface 72 and an inclined peripheral surface 73 which is provided with graduations 74 adapted to coact with an index and index plate 75 secured to the outer member 12a to indicate the angular positioning of the member 13a with respect to the member 12a.

The member 13a is provided with a drill guide receiving bore 76, the axis of which extends vertically and parallel to the axes 10 and 70 but offset from the axis 70 by the aforementioned distance R. The drill guide receiving aperture 76 is adapted to receive any one of a plurality of drill guide members 16, each of such members 16 being identical with the others except for the diameter of the drill guiding aperture 17 which is defined by the drill guide 16, the guiding aperture 17 of each of the members 16 corresponding to the different sizes of drills with which the guide is to be used.

Each of the drill guides 16 is preferably removably secured to the inner member 13a when placed in operative position therein so as to prevent upward movement of the member 16 during the time the drill is being used and also prevent rotation of the drill guide member 16 within the drill guide receiving bore 76 as a result of the frictional engagement of the rotating drill with the drill guiding aperture 17. Accordingly I provide a shoulder screw 62 (see Figs. 1 and 4) which includes a threaded shank portion 63 screwed into the upper plane surface 72 of the inner member 13a and which includes also a cylindrical shoulder portion 64 having a diameter somewhat exceeding the diameter of the shank portion 63 and including also a head portion 65 of cylindrical form having a diameter somewhat exceeding the diameter of the shoulder 64. The side surface of a head portion 61 of the drill guide 16 is preferably cut away as shown to form a partially cylindrical axially extending groove 66 to receive the head 65 and permit the drill guide 16 to be moved longitudinally in the bore 76 past the screw 62.

The cut away portion of the head 61 serves also to define a radially extending flange 67 adapted to pass beneath the head 65 so that by inserting the drill guide in the bore 76 to permit the screw head 65 to pass along the channel 66 and by then turning the drill guide 16, the flange 67 may be caused to pass under the head 65 and prevent upward movement of the guide. The cut away portion of the drill guide terminates in a shoulder 68 adapted to bear against the head 65 and prevent rotation of the drill guide.

In order that the two rotatable members 12a and 13a may be locked in any adjusted angular position, the cylindrical portion 46a of the outer member 12a is provided with a circumferentially extending recess 77 adapted to receive the end of a locking screw 48. A similar recess 78 is formed in the cylindrical portion 71 of the inner member 13a to receive an inner member locking screw 79 threaded into the outer member 12a.

It will be noted that this structure permits the axis of the drill guiding aperture 17 to be moved from a position coincident with the vertical axis 10 to a position spacing the axis of the drill guiding aperture 17 from the vertical axis 10 by a variable amount, the maximum value of which is equal to 2R.

I have illustrated in Fig. 3 the geometrical relationships involved in the operation of the device. It will be noted that in Fig. 3 the reference character 0 is employed to indicate the intersection of the vertical axis 10 with the surface of the workpiece 1, this intersection being arbitrarily positioned at the intersection of the reference lines 6 and 8 which are inscribed on the surface of the workpiece.

The circle identified by the reference character 80 in Fig. 3 represents the path of movement of the axis 70 occasioned by the rotation of the outer rotatable member 12a. The location of the axis 70 is identified by that reference character in Fig. 3 when the outer member 12a is rotated in a clockwise direction through an angle $y$. The circle identified by reference character 81 in Fig. 3 represents the path of movement of the drill guiding axis 0' occasioned by rotation of the inner member 13a after the outer member 12a is moved to and held in a position disposing the axis 70 in the location illustrated in Fig. 3.

The reference character 0' represents the location of the axis 0' occasioned by rotating the inner member 13a through an angle $z$ with respect to the then position of the outer member 12a, the angle $z$ being arbitrarily selected as that which will position the axis 0' on the longitudinal reference line 6. The dimension X indicated in Fig. 3 is used to represent the radial distance between the original origin 0 and the axis 0', the axis 0' indicating the new origin or location at which the hole drilled by a drill guided by the drill guide 16 will be drilled.

The magnitude of the angles $y$ and $z$ required to produce a radial offset distance X between the points 0 and 0' may be ascertained from the following equations:

$$y = \cos^{-1} \frac{X}{2R} \quad (1)$$

and $$z = 2 \sin^{-1} \frac{X}{2R} \quad (2)$$

where X represents the desired offset distance and R, as previously defined, represents the horizontal distance between the axes 10 and 70 and between the axes 70 and 0'.

After ascertaining the magnitudes of the angles $y$ and $z$ from the two above equations for a given offset X, the outer member 12a is first set to a position corresponding to the angle $y$ and locked in that position by means of the locking screw 48 and then the inner member 13a is rotated in the same direction through the angle $z$ and locked in that position by means of the locking screw 79. This will serve to position the new origin 0' on the longitudinal reference line 6 and if it is desired to extend the radial offset line 00' at an angle to the reference line 6, it is only necessary to first turn the outer protractor ring 9 to that desired angular position and lock the same in such position by means of the locking screw 30 before the rotatable members 12a and 13a are moved to their desired positions.

The operation of the device can perhaps be better understood by considering a numerical example:

Example

Assume that it is desired to shift the origin 0 to a new location 0' spaced 0.100" from the original location of the origin 0 and in such location as to make an angle of 45° with the reference line 6. Assume further that the offset distance R between the various axes is equal to 0.125". From equation (1) above, angle $y$ is ascertained to be 66°25'. From equation (2) angle $z$ is ascertained to be 47°10'. Thereupon the outer protractor ring 9 is turned in the desired direction until the desired angle of 45° is indicated by the index 34 and then locked in that position by means of the thumb screw 30. Thereupon the outer member 12a is rotated in either direction to a position such that the ascertained angle of 66°25' is indicated by the scale 40a opposite the index 38.

After locking the outer member 12a in such position by means of the locking screw 48, the inner member 13a is rotated in the same direction as the outer member 12a was rotated and to a position such that the ascertained angle of 47°10' is indicated by the scale 74 opposite the index 75. The inner member 13a is then locked in that adjusted position by means of the screw 79.

This operation serves to position the axis 0' at a distance of 0.100" from the origin 0 defined by the intersection of the reference lines 6 and 8 and serves also to extend the line 00' at an angle of 45° with respect to the reference line 6. Thereafter a drill guide 16 of the desired size may be inserted in the drill guide receiving bore 76 and the device employed to drill a hole centered at the location of the new origin 0'.

From the foregoing it will be observed that I have provided a novel drill jig or drill guide by means of which the axis of the hole drilled and guided by the device may be positioned as desired with respect to the reference lines marked on the workpiece and identifying the original desired location of the hole.

While I have shown and described the preferred embodiment of my invention, I do not desire to be limited to any of the details of construction shown or described herein, except as defined in the appended claim.

I claim:

In a fixture, the combination of: an inner bushing defining a tool guiding line; an outer bushing; means mounting said inner bushing on said outer bushing for rotation about an axis extending parallel to but spaced from said tool guiding line; protractor means associated with said inner bushing and with said outer bushing for measuring the angular position of said inner bushing relative to said outer bushing; a base member; means mounting said outer bushing on said base member for rotation about another axis extending parallel to but spaced from the axis of rotation of said inner bushing; an adjustable protractor ring mounted for independent rotation on said base member concentrically with said outer bushing; means on said base member defining an index positioned to cooperate with said protractor ring; means on said protractor ring defining another index; and means on said outer bushing defining a protractor scale positioned to cooperate with said other index.

WILLIAM C. WILLIAMS.